United States Patent
Lo et al.

(10) Patent No.: US 10,542,130 B1
(45) Date of Patent: Jan. 21, 2020

(54) MOBILE DEVICE

(71) Applicant: Quanta Computer Inc., Taoyuan (TW)

(72) Inventors: Wen-Yuan Lo, Taoyuan (TW);
Mao-Liang Tien, Taoyuan (TW);
Jui-Chun Jao, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/410,262

(22) Filed: May 13, 2019

(30) Foreign Application Priority Data

Jan. 18, 2019 (TW) .............................. 108101926 A (51) Int. Cl.
*H04M 1/02* (2006.01)

(52) U.S. Cl.
CPC ....... *H04M 1/0277* (2013.01); *H04M 1/0266* (2013.01)

(58) Field of Classification Search
CPC ..................................................... H04M 1/02
See application file for complete search history.

(56) References Cited

U.S. PATENT DOCUMENTS

| | | | |
|---|---|---|---|
| 9,929,473 B2 | 3/2018 | Huang et al. | |
| 2014/0300518 A1* | 10/2014 | Ramachandran | H01Q 1/243 343/702 |
| 2016/0190690 A1* | 6/2016 | Badran | H01Q 1/243 343/750 |
| 2017/0005414 A1 | 1/2017 | Yang | |
| 2019/0006764 A1 | 1/2019 | Yen et al. | |
| 2019/0027811 A1* | 1/2019 | Chen | H01Q 1/243 |

FOREIGN PATENT DOCUMENTS

| TW | 201703350 A | 1/2017 |
|---|---|---|
| TW | 201705610 A | 2/2017 |
| TW | 1642230 B | 11/2018 |

OTHER PUBLICATIONS

Chinese language office action dated Dec. 9, 2019, issued in application No. TW 108101926.

* cited by examiner

*Primary Examiner* — Michael T Vu
(74) *Attorney, Agent, or Firm* — McClure, Qualey & Rodack, LLP (57) ABSTRACT

A mobile device includes a metal back cover, a display device, a display frame, a nonconductive filling element, a dielectric substrate, a ground element, and a radiator. The metal back cover has a slot. The display device and the display frame are disposed opposite to the metal back cover. The nonconductive filling element is at least partially embedded in the slot. The dielectric substrate is disposed on the nonconductive filling element. The ground element is coupled to the metal back cover. The radiator is coupled to the ground element and is disposed on the dielectric substrate. An antenna structure is formed by the radiator and the slot of the metal back cover. The distance from the slot to an edge of the metal back cover is shorter than 10 mm.

9 Claims, 7 Drawing Sheets

MOBILE DEVICE

CROSS REFERENCE TO RELATED APPLICATIONS

This application claims priority of Taiwan Patent Application No. 108101926 filed on Jan. 18, 2019, the entirety of which is incorporated by reference herein.

BACKGROUND OF THE INVENTION

Field of the Invention

The disclosure generally relates to a mobile device, and more particularly, it relates to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, these newly added metal elements tend to negatively affect the antennas used for wireless communication in mobile devices, thereby degrading the overall communication quality of the mobile devices. As a result, there is a need to propose a mobile device with a novel antenna structure, so as to overcome the problems of the prior art.

BRIEF SUMMARY OF THE INVENTION

In an exemplary embodiment, the disclosure is directed to a mobile device including a metal back cover, a display device, a display frame, a nonconductive filling element, a dielectric substrate, a ground element, and a radiator. The metal back cover has a slot. The display device and the display frame are disposed opposite to the metal back cover. The nonconductive filling element is at least partially embedded in the slot. The dielectric substrate is disposed on the nonconductive filling element. The ground element is coupled to the metal back cover. The radiator is coupled to the ground element and is disposed on the dielectric substrate. An antenna structure is formed by the radiator and the slot of the metal back cover. The distance from the slot to an edge of the metal back cover is shorter than 10 mm.

In some embodiments, the ground element is a ground copper foil extending from the metal back cover onto the dielectric substrate.

In some embodiments, the antenna structure covers a first frequency band from 2400 MHz to 2500 MHz, and a second frequency band from 5150 MHz to 5850 MHz.

In some embodiments, the radiator includes a first radiation element and a second radiation element. The first radiation element has a first feeding point and is coupled to the ground element. The second radiation element is coupled to the ground element. Both the first radiation element and the second radiation element extend across the slot.

In some embodiments, a first coupling gap is formed between the first radiation element and the second radiation element. The width of the first coupling gap is smaller than 2 mm.

In some embodiments, the mobile device is a 14-inch notebook computer. The distance from the slot to the edge of the metal back cover is substantially equal to 7.5 mm.

In some embodiments, the radiator includes a third radiation element, a fourth radiation element, and a fifth radiation element. The third radiation element has a second feeding point. The fourth radiation element is coupled to the ground element. The fifth radiation element is coupled to the ground element. The fifth radiation element extends into a region between the third radiation element and the fourth radiation element.

In some embodiments, a second coupling gap is formed between the third radiation element and the fifth radiation element. The width of the second coupling gap is smaller than 0.5 mm. A third coupling gap is formed between the fourth radiation element and the fifth radiation element. The width of the third coupling gap is smaller than 0.5 mm.

In some embodiments, the radiator further includes a sixth radiation element coupled to the ground element. The fifth radiation element is positioned between the fourth radiation element and the sixth radiation element.

In some embodiments, the mobile device is a 15-inch notebook computer. The distance from the slot to the edge of the metal back cover is substantially equal to 6.8 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
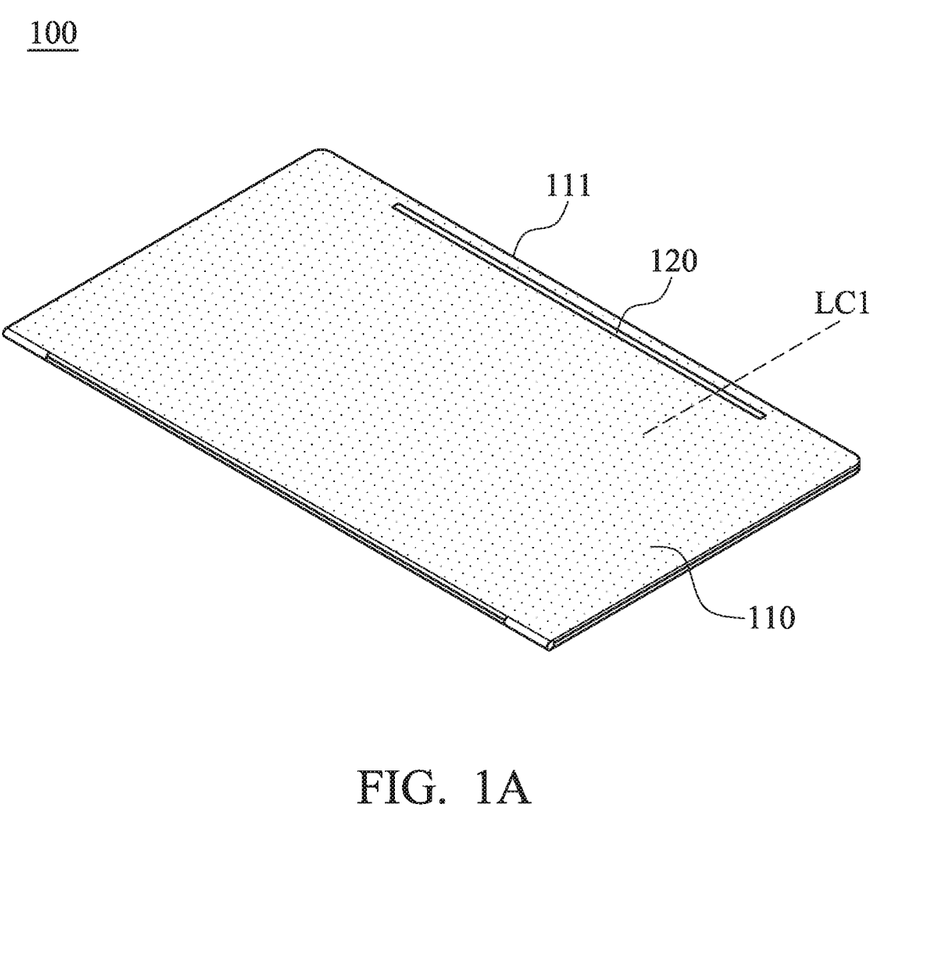
FIG. 1A is a perspective view of a mobile device according to an embodiment of the invention.
Figure 1B:
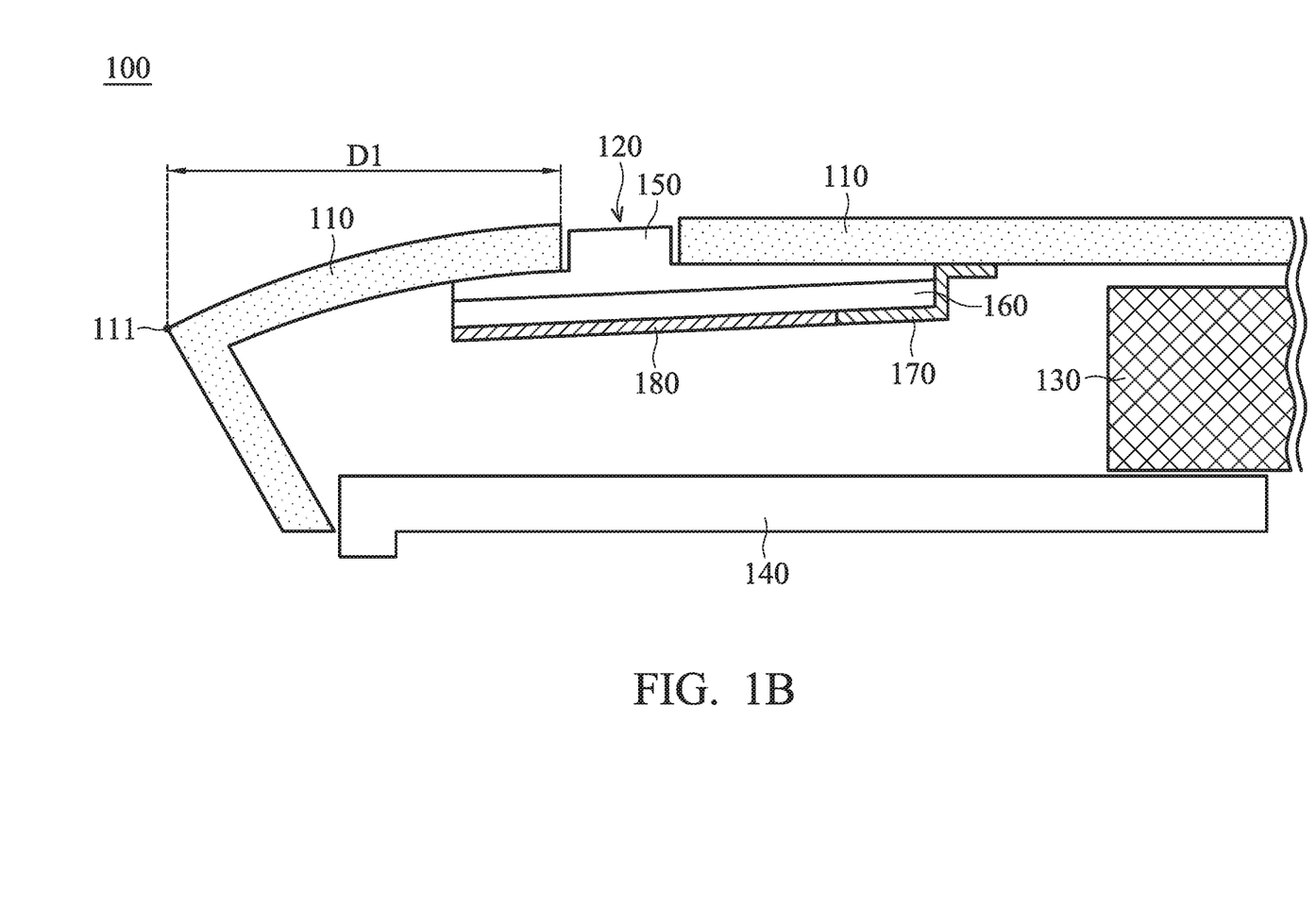
FIG. 1B is a sectional view of a mobile device according to an embodiment of the invention.

FIG. 1A is a perspective view of a mobile device 100 according to an embodiment of the invention. FIG. 1B is a sectional view of the mobile device 100 according to an embodiment of the invention (along a sectional line LC1 of FIG. 1A). Please refer to FIG. 1A and FIG. 1B together. In the embodiment of FIG. 1A and FIG. 1B, the mobile device 100 is a notebook computer, but the invention is not limited thereto. In alternative embodiments, the mobile device 100 is a smart phone or a tablet computer.

As shown in FIG. 1A and FIG. 1B, the mobile device 100 at least includes a metal back cover 110, a display device 130, a display frame 140, a nonconductive filling element 150, a dielectric substrate 160, a ground element 170, and a radiator 180. The display frame 140 and the dielectric substrate 160 may be made of nonconductive materials, such as plastic materials or dielectric materials. The ground element 170 and the radiator 180 may be made of conductive materials, such as metal materials.

The metal back cover 110 is considered an "A-component" in the field of notebook computers. The metal back cover 110 has a slot 120, which may substantially have a straight-line shape and may be substantially parallel to an (top) edge 111 of the metal back cover 110. In some embodiments, the slot 120 is a closed slot having a first closed end 121 and a second closed end 122 which are away from each other (please refer to the following figures). In alternative embodiments, the slot 120 is divided into a plurality of sub-slots which are separate from each other. The display device 130 and the display frame 140 are disposed opposite to the metal back cover 110. The display device 130 is surrounded by the display frame 140. The display frame 140 is considered a "B-component" in the field of notebook computers. The nonconductive filling element 150 is at least partially embedded in the slot 120. The nonconductive filling element 150 has waterproof and dustproof functions, and its shape is not limited in the invention. The dielectric substrate 160 is disposed on the nonconductive filling element 150. For example, the dielectric substrate 160 may be a PCB (Printed Circuit Board) or an FCB (Flexible Circuit Board). The ground element 170 may be coupled to the metal back cover 110 by using LDS (Laser Direct Structuring) technology. For example, the ground element 170 may be a ground copper foil extending from the metal back cover 110 onto the dielectric substrate 160. The radiator 180 is coupled to the ground element 170 and is disposed on the dielectric substrate 160. The radiator 180 may be adjacent to the metal back cover 110. It should be noted that the term "adjacent" or "close" over the disclosure means that the distance (spacing) between two corresponding elements is smaller than a predetermined distance (e.g., 5 mm or shorter), or means that the two corresponding elements directly touch each other (i.e., the aforementioned distance/spacing therebetween is reduced to 0). Furthermore, the dielectric substrate 160 and the radiator 180 thereon may be disposed inside the inner space which is defined by the metal back cover 110 and the display frame 140.

In a preferred embodiment, an antenna structure is formed by the radiator 180 and the slot 120 of the metal back cover 110. The distance D1 from the slot 120 to the edge 111 of the metal back cover 110 is shorter than 10 mm. The aforementioned term "distance/spacing" generally means the shortest distance between two corresponding elements. It should be noted that in order to avoid interference, a conventional slot antenna usually has a predetermined distance or longer (e.g., 15 mm or longer) to the edge of the metal back cover. However, this may destroy the appearance consistency of the mobile device. With the design of the invention, the incorporation of the slot 120 does not negatively affect the appearance of the metal back cover 110, and it can improve the overall visual appearance of the mobile device 100 and enhance the whole communication quality of the mobile device 100.

The following embodiments will introduce the detailed features of the above antenna structure of the mobile device 100. It should be understood that these figures and descriptions are merely exemplary, rather than restriction of the scope of the invention.

Figure 2:
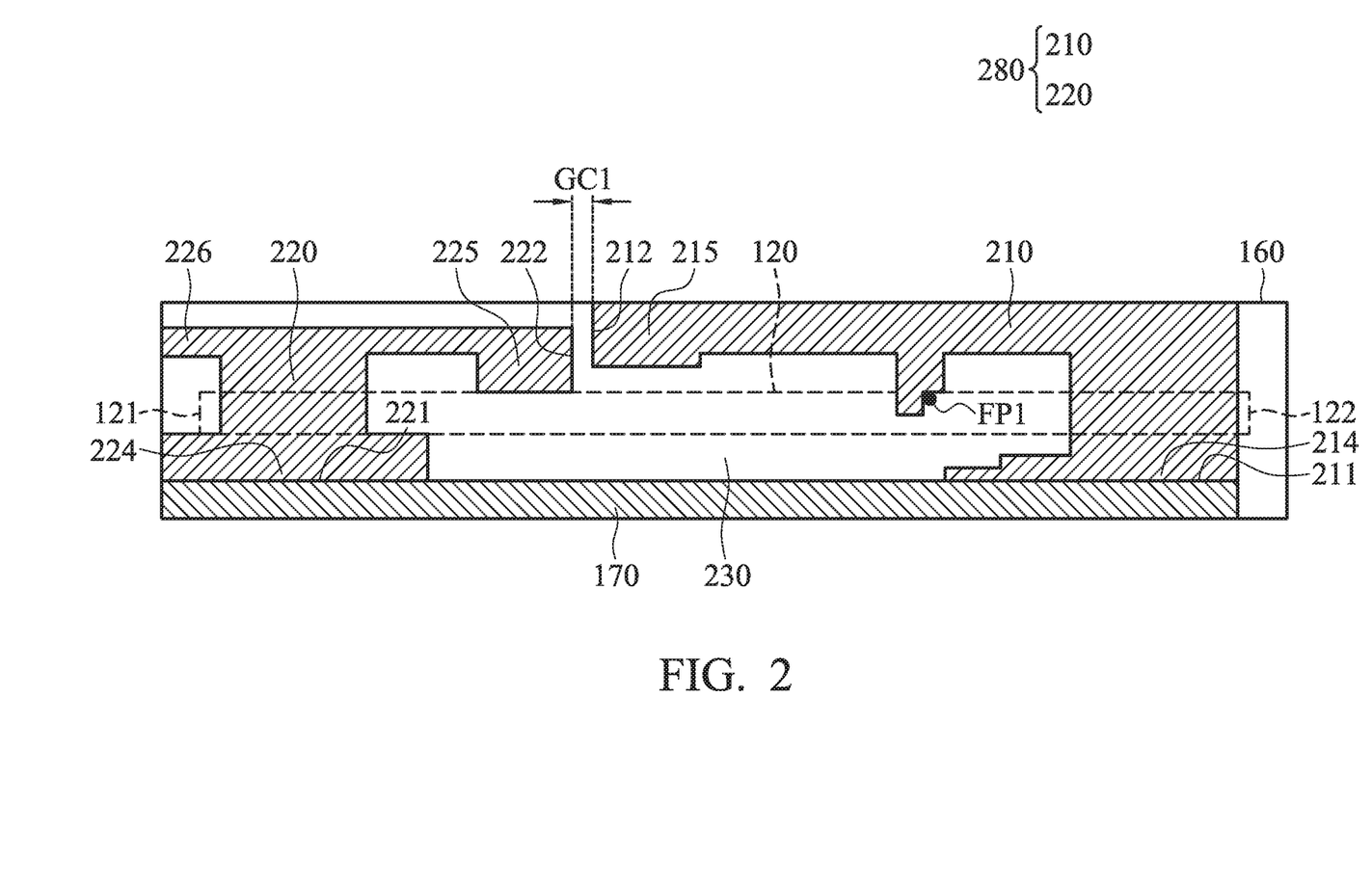
FIG. 2 is a top view of a radiator according to an embodiment of the invention.

FIG. 2 is a top view of a radiator 280 according to an embodiment of the invention. In the embodiment of FIG. 2, the radiator 280 of the antenna structure at least includes a first radiation element 210 and a second radiation element 220. Both the first radiation element 210 and the second radiation element 220 extend across the slot 120 of the metal back cover 110. That is, the first radiation element 210 has a first vertical projection on the metal back cover 110, the second radiation element 220 has a second vertical projection on the metal back cover 110, and both the first vertical projection and the second vertical projection at least partially overlap the slot 120. The first radiation element 210 may substantially have an inverted L-shape. The first radiation element 210 has a first feeding point FP1, which may be coupled to a signal source, such as an RF (Radio Frequency) module. The first radiation element 210 has a first end 211 and a second end 212. The first end 211 of the first radiation element 210 is coupled to the ground element 170. The second end 212 of the first radiation element 210 is an open end. The first feeding point FP1 is positioned between the first end 211 and the second end 212 of the first radiation element 210. The first feeding point FP1 is closer than the second end 212 than the first end 211. The second radiation element 220 may substantially have an L-shape. The second radiation element 220 has a first end 221 and a second end 222. The first end 221 of the second radiation element 220 is coupled to the ground element 170. The second end 222 of the second radiation element 220 is an open end, which extends toward the second end 212 of the first radiation element 210. A first coupling gap GC1 is formed between the second end 212 of the first radiation element 210 and the second end 222 of the second radiation element 220. A non-metal region 230 is surrounded by the first radiation element 210, the second radiation element 220, and the ground element 170. The non-metal region 230 is connected to the first coupling gap GC1.

Figure 3:
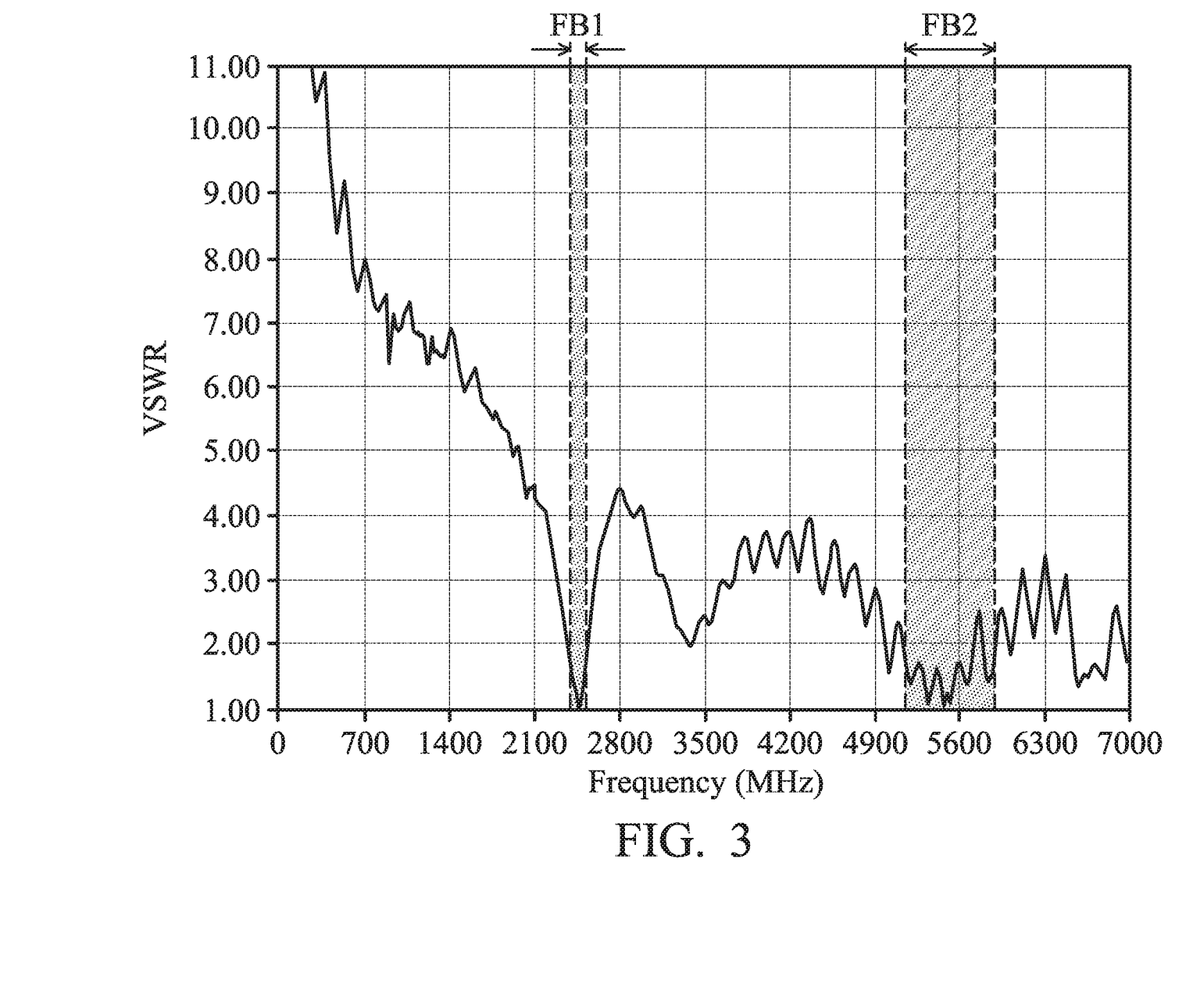
FIG. 3 is a diagram of VSWR (Voltage Standing Wave Ratio) of an antenna structure including a radiator according to an embodiment of the invention.

FIG. 3 is a diagram of VSWR (Voltage Standing Wave Ratio) of the antenna structure including the radiator 280 according to an embodiment of the invention. The horizontal axis represents the operation frequency (MHz), and the vertical axis represents the VSWR. According to the measurement of FIG. 3, the antenna structure of FIG. 2 can cover a first frequency band FB1 and a second frequency band FB2. The first frequency band FB1 may be from 2400 MHz to 2500 MHz. The second frequency band FB2 may be from 5150 MHz to 5850 MHz. Therefore, the aforementioned antenna structure can support at least the dual-band operations of WLAN (Wireless Local Area Networks) 2.4 GHz/5 GHz. With respect to the antenna operation principles, the first radiation element 210 and the second radiation element 220 are mainly excited to generate the first frequency band FB1, and the second radiation element 220 is mainly excited to generate the second frequency band FB2. According to the practical measurement, the radiation efficiency of the antenna structure including the radiator 280 is about −2.71 dB within the first frequency band FB1, and the radiation efficiency of the antenna structure including the radiator 280 is about −3.58 dB within the second frequency band FB2. It can meet the requirements of practical applications of general mobile communication devices.

In some embodiments, the first radiation element 210 further includes a first widening portion 214 and a second widening portion 215. The first widening portion 214 is positioned at the first end 211 of the first radiation element 210 and is directly coupled to the ground element 170. The second widening portion 215 is positioned at the second end 212 of the first radiation element 210. According to the practical measurement, the first widening portion 214 and the second widening portion 215 are configured to increase the low-frequency operation bandwidth of the antenna structure. In some embodiments, the second radiation element 220 further includes a third widening portion 224 and a fourth widening portion 225. The third widening portion 224 is positioned at the first end 221 of the second radiation element 220 and is directly coupled to the ground element 170. The fourth widening portion 225 is positioned at the second end 222 of the second radiation element 220 and is adjacent to the second widening portion 215 of the first radiation element 210. According to the practical measurement, the third widening portion 224 and the fourth widening portion 225 are configured to increase the high-frequency operation bandwidth of the antenna structure. In some embodiments, the second radiation element 220 further includes an additional radiation branch 226. The additional radiation branch 226 is coupled to a right-angle bend of the second radiation element 220. The additional radiation branch 226 and the second end 222 of the second radiation element 220 substantially extend in opposite directions. According to the practical measurement, the additional radiation branch 226 is configured to fine-tune the impedance matching of the antenna structure. It should be understood that the first widening portion 214, the second widening portion 215, the third widening portion 224, the fourth widening portion 225, and the additional radiation branch 226 are optional elements, and they may be omitted in other embodiments.

In some embodiments, the element sizes of the mobile device 100 including the radiator 280 are as follows. The mobile device 100 may be a 14-inch notebook computer. To enhance the coupling effect between elements, the width of the first coupling gap GC1 should be smaller than 2 mm. The length of the first radiation element 210 may be longer than or equal to the length of the second radiation element 220. With such a design, the distance D1 from the slot 120 to the edge 111 of the metal back cover 110 may be substantially equal to 7.5 mm. The above ranges of element sizes are calculated and obtained according to many experiment results, and they help to optimize the operation bandwidth and impedance matching of the antenna structure of the mobile device 100.

Figure 4:
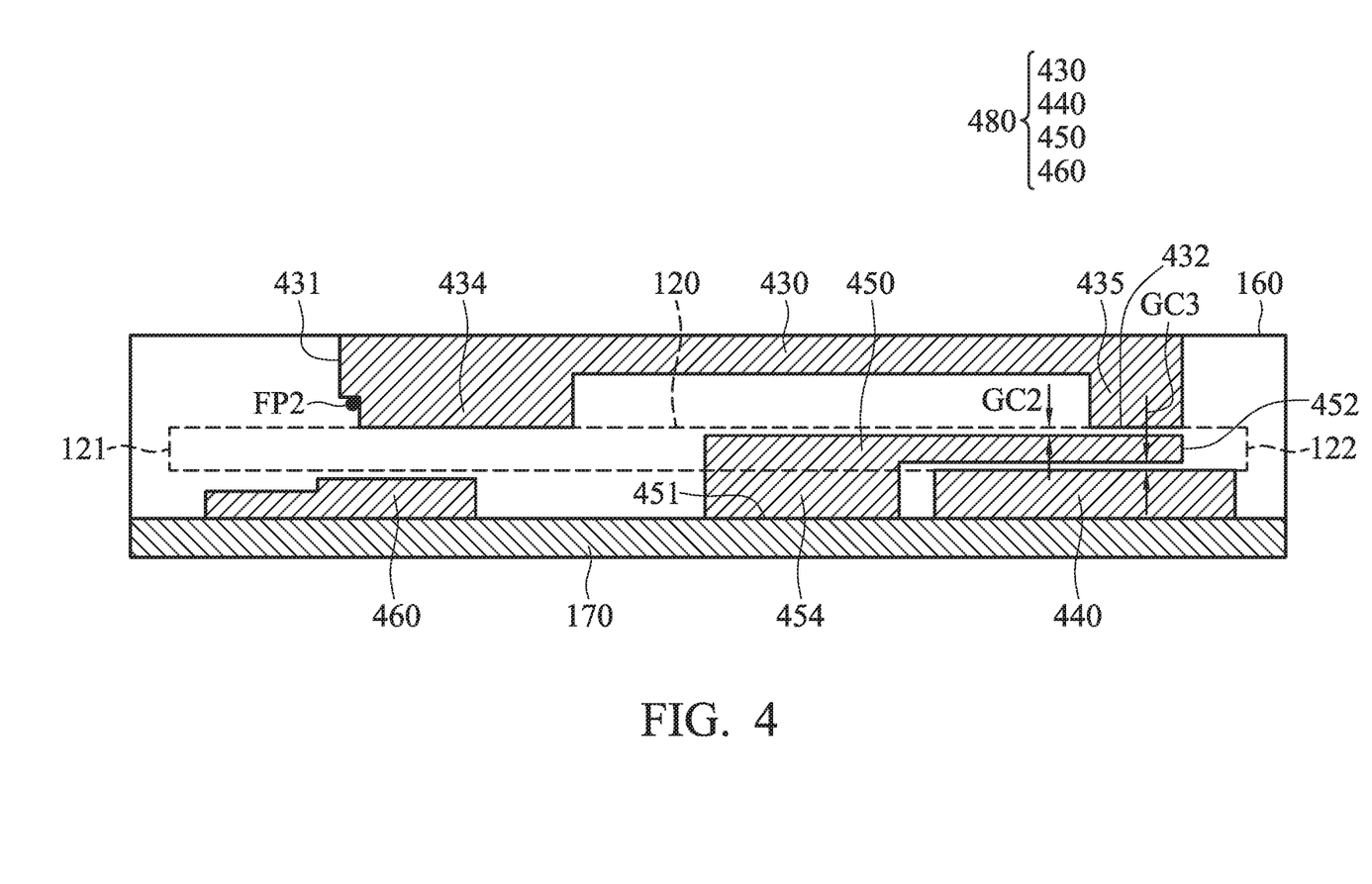
FIG. 4 is a top view of a radiator according to another embodiment of the invention.

FIG. 4 is a top view of a radiator 480 according to another embodiment of the invention. In the embodiment of FIG. 4, the radiator 480 of the antenna structure at least includes a third radiation element 430, a fourth radiation element 440, and a fifth radiation element 450. The fifth radiation element 450 extends across at least a portion of the slot 120 of the metal back cover 110. That is, the fifth radiation element 450 has a third vertical projection on the metal back cover 110, and the third vertical projection at least partially overlaps the slot 120. The third radiation element 430 may substantially have a straight-line shape or an inverted U-shape. The third radiation element 430 has a second feeding point FP2, which may be coupled to a signal source. The third radiation element 430 has a first end 431 and a second end 432. The second feeding point FP2 is positioned at the first end 431 of the third radiation element 430. The second end 432 of the third radiation element 430 is an open end. The fourth radiation element 440 may substantially have a rectangular shape. The fourth radiation element 440 is coupled to the ground element 170. The fifth radiation element 450 may substantially have an L-shape. The fifth radiation element 450 has a first end 451 and a second end 452. The first end 451 of the fifth radiation element 450 is coupled to the ground element 170. The second end 452 of the fifth radiation element 450 is an open end, which extends into a region between the third radiation element 430 and the fourth radiation element 440. A second coupling gap GC2 is formed between the second end 432 of the third radiation element 430 and the second end 452 of the fifth radiation element 450. A third coupling gap GC3 is formed between the fourth radiation element 440 and the second end 452 of the fifth radiation element 450.

Figure 5:
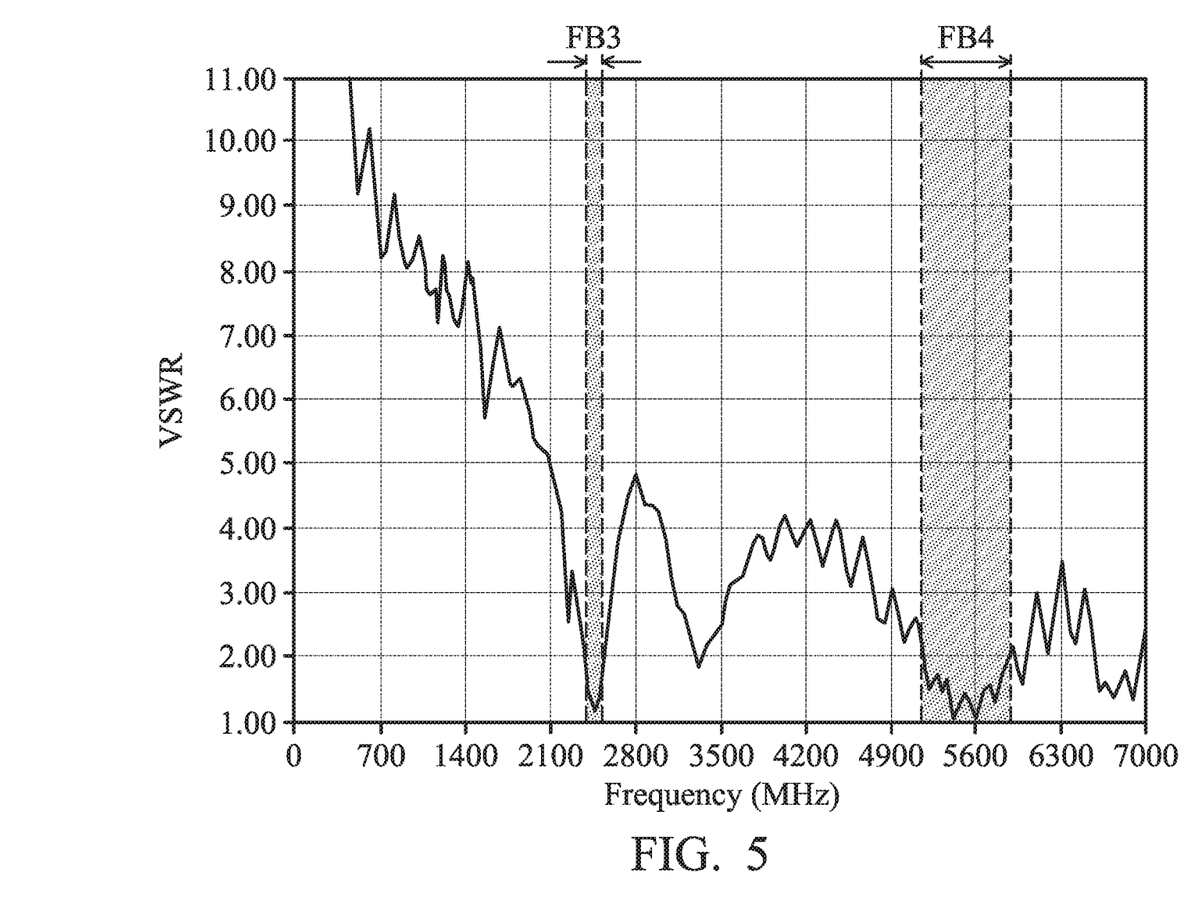
FIG. 5 is a diagram of VSWR of an antenna structure including another radiator according to another embodiment of the invention.

FIG. 5 is a diagram of VSWR of the antenna structure including the radiator 480 according to another embodiment of the invention. The horizontal axis represents the operation frequency (MHz), and the vertical axis represents the VSWR. According to the measurement of FIG. 5, the antenna structure of FIG. 4 can cover a first frequency band FB3 and a second frequency band FB4. The first frequency band FB3 may be from 2400 MHz to 2500 MHz. The second frequency band FB4 may be from 5150 MHz to 5850 MHz. Therefore, the aforementioned antenna structure can support at least the dual-band operations of WLAN 2.4 GHz/5 GHz. With respect to the antenna operation principles, the third radiation element 430 and the fifth radiation element 450 are mainly excited to generate the first frequency band FB3, and the fifth radiation element 450 is mainly excited to generate the second frequency band FB4. According to the practical measurement, the radiation efficiency of the antenna structure including the radiator 480 is about −3.73 dB within the first frequency band FB3, and the radiation efficiency of the antenna structure including the radiator 480 is about −4.19 dB within the second frequency band FB4. It can meet the requirements of practical applications of general mobile communication devices.

In some embodiments, the third radiation element 430 further includes a fifth widening portion 434 and a sixth widening portion 435. The fifth widening portion 434 is positioned at the first end 431 of the third radiation element 430. The sixth widening portion 435 is positioned at the second end 432 of the third radiation element 430. According to the practical measurement, the fifth widening portion 434 and the sixth widening portion 435 are configured to increase the low-frequency operation bandwidth of the antenna structure. In some embodiments, the fifth radiation element 450 further includes a seventh widening portion 454. The seventh widening portion 454 is positioned at the first end 451 of the fifth radiation element 450 and is directly coupled to the ground element 170. According to the practical measurement, the seventh widening portion 454 is configured to increase the high-frequency operation bandwidth of the antenna structure. In some embodiments, the radiator 480 further includes a sixth radiation element 460. The sixth radiation element 460 is coupled to the ground element 170. The sixth radiation element 460 extends toward the fifth widening portion 434 of the third radiation element 430. The sixth radiation element 460 may substantially have a rectangular shape or a stepped shape. The fifth radiation element 450 is positioned between the fourth radiation element 440 and the sixth radiation element 460. According to the practical measurement, the sixth radiation element 460 is configured to fine-tune the impedance matching of the antenna structure. It should be understood that the fifth widening portion 434, the sixth widening portion 435, the seventh widening portion 454, and the sixth radiation element 460 are optional elements, and they may be omitted in other embodiments.

In some embodiments, the element sizes of the mobile device 100 including the radiator 480 are as follows. The mobile device 100 may be a 15-inch notebook computer. To enhance the coupling effect between elements, the width of the second coupling gap GC2 should be smaller than 0.5 mm, and the width of the third coupling gap GC3 should be smaller than 0.5 mm. The length of the third radiation element 430 may be longer than or equal to the length of the fifth radiation element 450. The length of the third radiation element 430 may be substantially equal to 0.25 wavelength ($\lambda/4$) of the central frequency of the first frequency band FB3. With such a design, the distance D1 from the slot 120 to the edge 111 of the metal back cover 110 may be substantially equal to 6.8 mm. The above ranges of element sizes are calculated and obtained according to many experiment results, and they help to optimize the operation bandwidth and impedance matching of the antenna structure of the mobile device 100.

Figure 6:
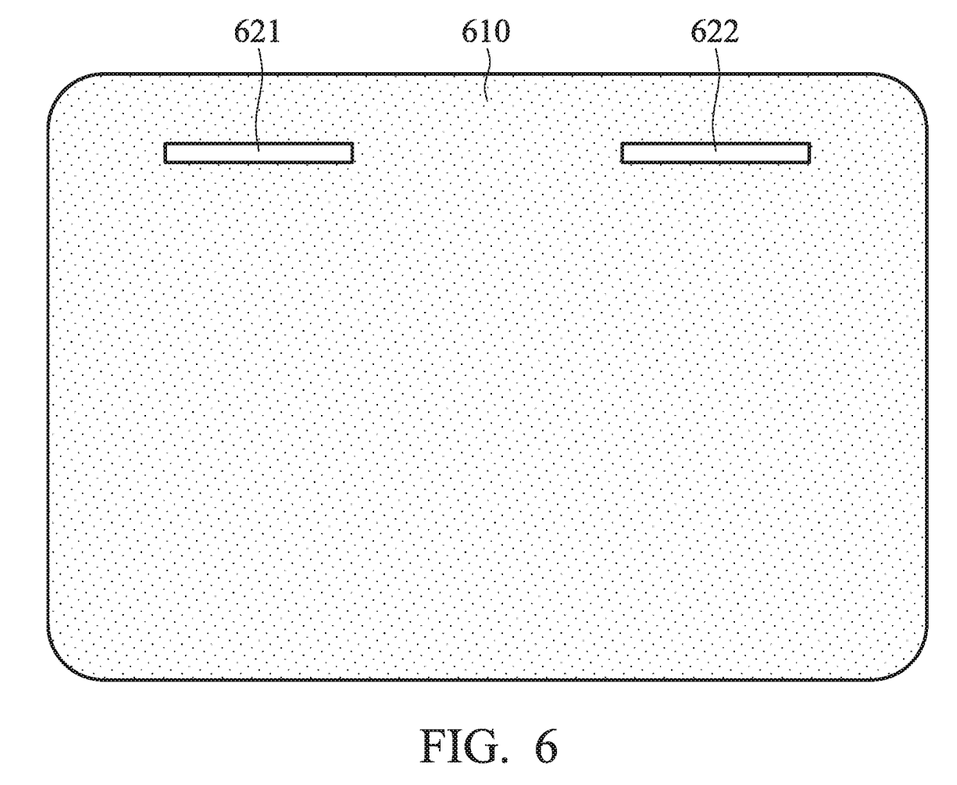
FIG. 6 is a top view of a metal back cover according to another embodiment of the invention.

FIG. 6 is a top view of a metal back cover 610 according to another embodiment of the invention. In the embodiment of FIG. 6, the metal back cover 610 of the mobile device 100 has a first slot 621 and a second slot 622. The first slot 621 and the second slot 622 are closed slots which are completely separate from each. Each of the first slot 621 and the second slot 622 may substantially have a straight-line shape, and they are arranged in the same straight-line. The aforementioned antenna structure may be formed based on the first slot 621, the second slot 622, or both. For example, the first slot 621 may be used as a main antenna structure of the mobile device 100, and the second slot 622 may be used as an auxiliary antenna structure of the mobile device 100, but they are not limited thereto.

The invention proposes a novel antenna structure. When the antenna structure is applied to a mobile device including a metal back cover, the metal back cover does not negatively affect the radiation performance of the antenna structure because the metal back cover is considered as an extension portion of the antenna structure. Furthermore, since the distance between the slot and the edge of the metal back cover is very short, the incorporation of the slot does not negatively affect the appearance design of the metal back cover. In conclusion, the invention has at least the advantages of small size, wide bandwidth, and beautiful device appearance, and therefore it is suitable for application in a variety of mobile communication devices with narrow borders.

Note that the above element sizes, element shapes, and frequency ranges are not limitations of the invention. An antenna designer can fine-tune these settings or values according to different requirements. It should be understood that the mobile device and the antenna structure of the invention are not limited to the configurations of FIGS. 1-6. The invention may merely include any one or more features of any one or more embodiments of FIGS. 1-6. In other words, not all of the features displayed in the figures should be implemented in the mobile device and the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:
   a metal back cover, having a slot;
   a display device;
   a display frame, wherein the display device and the display frame are disposed opposite to the metal back cover;
   a nonconductive filling element, at least partially embedded in the slot;
   a dielectric substrate, disposed on the nonconductive filling element;
   a ground element, coupled to the metal back cover; and
   a radiator, coupled to the ground element, and disposed on the dielectric substrate, wherein an antenna structure is formed by the radiator and the slot of the metal back cover;
   wherein a distance from the slot to an edge of the metal back cover is shorter than 10 mm;
   wherein the ground element is a ground copper foil extending from the metal back cover onto the dielectric substrate.

2. The mobile device as claimed in claim 1, wherein the antenna structure covers a first frequency band from 2400 MHz to 2500 MHz, and a second frequency band from 5150 MHz to 5850 MHz.

3. A mobile device, comprising:
   a metal back cover, having a slot;
   a display device;
   a display frame, wherein the display device and the display frame are disposed opposite to the metal back cover;
   a nonconductive filling element, at least partially embedded in the slot;
   a dielectric substrate, disposed on the nonconductive filling element;
   a ground element, coupled to the metal back cover; and a radiator, coupled to the ground element, and disposed on the dielectric substrate, wherein an antenna structure is formed by the radiator and the slot of the metal back cover;

wherein a distance from the slot to an edge of the metal back cover is shorter than 10 mm;

wherein the radiator comprises:

a first radiation element, having a first feeding point, and coupled to the ground element; and a second radiation element, coupled to the ground element, wherein both the first radiation element and the second radiation element extend across the slot.

4. The mobile device as claimed in claim 3, wherein a first coupling gap is formed between the first radiation element and the second radiation element, and a width of the first coupling gap is smaller than 2 mm.

5. The mobile device as claimed in claim 3, wherein the mobile device is a 14-inch notebook computer, and the distance from the slot to the edge of the metal back cover is substantially equal to 7.5 mm.

6. A mobile device, comprising:

a metal back cover, having a slot;

a display device;

a display frame, wherein the display device and the display frame are disposed opposite to the metal back cover;

a nonconductive filling element, at least partially embedded in the slot;

a dielectric substrate, disposed on the nonconductive filling element;

a ground element, coupled to the metal back cover; and a radiator, coupled to the ground element, and disposed on the dielectric substrate, wherein an antenna structure is formed by the radiator and the slot of the metal back cover;

wherein a distance from the slot to an edge of the metal back cover is shorter than 10 mm;

wherein the radiator comprises:

a third radiation element, having a second feeding point;

a fourth radiation element, coupled to the ground element; and a fifth radiation element, coupled to the ground element, and extending into a region between the third radiation element and the fourth radiation element.

7. The mobile device as claimed in claim 6, wherein a second coupling gap is formed between the third radiation element and the fifth radiation element, a width of the second coupling gap is smaller than 0.5 mm, a third coupling gap is formed between the fourth radiation element and the fifth radiation element, and a width of the third coupling gap is smaller than 0.5 mm.

8. The mobile device as claimed in claim 6, wherein the radiator further comprises:

a sixth radiation element, coupled to the ground element, wherein the fifth radiation element is positioned between the fourth radiation element and the sixth radiation element.

9. The mobile device as claimed in claim 6, wherein the mobile device is a 15-inch notebook computer, and the distance from the slot to the edge of the metal back cover is substantially equal to 6.8 mm.

\* \* \* \* \*